United States Patent
Tanaka et al.

(10) Patent No.: US 11,800,198 B2
(45) Date of Patent: Oct. 24, 2023

(54) INFORMATION PROCESSING APPARATUS, SERVER, USER APPARATUS, AND INFORMATION PROCESSING SYSTEM

(71) Applicant: NTT DOCOMO, INC., Chiyoda-ku (JP)

(72) Inventors: Akira Tanaka, Chiyoda-ku (JP); Makoto Murasaki, Chiyoda-ku (JP); Mitsuhiro Ogata, Chiyoda-ku (JP); Hiroki Ishizuka, Chiyoda-ku (JP); Syougo Ikeda, Chiyoda-ku (JP); Syou Nanao, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 164 days.

(21) Appl. No.: 17/437,619

(22) PCT Filed: Dec. 18, 2019

(86) PCT No.: PCT/JP2019/049566
§ 371 (c)(1),
(2) Date: Sep. 9, 2021

(87) PCT Pub. No.: WO2020/194925
PCT Pub. Date: Jan. 10, 2020

(65) Prior Publication Data
US 2022/0182733 A1 Jun. 9, 2022

(30) Foreign Application Priority Data
Mar. 27, 2019 (JP) .................. 2019-060660

(51) Int. Cl.
*H04N 21/81* (2011.01)
*H04N 21/44* (2011.01)
*H04N 21/8405* (2011.01)

(52) U.S. Cl.
CPC ... *H04N 21/8133* (2013.01); *H04N 21/44008* (2013.01); *H04N 21/8405* (2013.01)

(58) Field of Classification Search
CPC .......... H04N 21/8133; H04N 21/44008; H04N 21/8405
See application file for complete search history.

(56) References Cited

U.S. PATENT DOCUMENTS

| 2014/0016822 A1 | 1/2014 | Sakamoto |
| 2016/0171339 A1* | 6/2016 | Choi ..................... G06F 18/256 382/103 |
| 2019/0238952 A1* | 8/2019 | Boskovich .......... G06F 16/7837 |

FOREIGN PATENT DOCUMENTS

| JP | 2014-16882 A | 1/2014 |
| JP | 2015-154195 A | 8/2015 |

OTHER PUBLICATIONS

International Search Report dated Mar. 17, 2020 in PCT/JP2019/049566 filed on Dec. 18, 2019, 2 pages.

* cited by examiner

*Primary Examiner* — Chenea Davis
(74) *Attorney, Agent, or Firm* — Oblon, McClelland, Maier & Neustadt, L.L.P.

(57) ABSTRACT

A processor of a server includes: a keyword generator that narrows object images from video based on both activity information on the activity history of a user and a first level of narrowing down and generates candidate keywords, as candidate comments, by generating a candidate keyword for each of the images; an identifier that identifies one or more target keywords from among the candidate keywords generated by the keyword generator based on both the activity information and a second level of narrowing down; a comment generator that generates, for each of the one or more target keywords, a comment related to each target (Continued)

keyword; and an adjuster that adjusts the first level of narrowing down in the keyword generator and the second level of narrowing down in the identifier in accordance with processing information on processing performable by the keyword generator and processing performable by the identifier.

9 Claims, 8 Drawing Sheets

INFORMATION PROCESSING APPARATUS, SERVER, USER APPARATUS, AND INFORMATION PROCESSING SYSTEM

TECHNICAL FIELD

The present invention relates to an information processing apparatus, a server, a user apparatus, and an information processing system.

BACKGROUND ART

Patent Document 1 discloses a technique for converting contents displayed on a display into keywords, narrowing down the keywords based on the activity history of a user, and generating icons for displaying information on the narrowed down keywords.

Patent Document 2 discloses a technique for identifying the feature value of an object of interest to a user based on the activity history of the user, narrowing down displayed object images by using the identified feature value, and making comments on the narrowed down object images.

RELATED ART DOCUMENT

Patent Documents

Patent Document 1: Japanese Patent Application Laid-Open Publication No. 2015-154195
Patent Document 2: Japanese Patent Application Laid-Open Publication No. 2014-16882

SUMMARY OF THE INVENTION

Problem to be Solved by the Invention

The related art does not disclose how to distribute a processing load for narrowing down keywords and a processing load for narrowing down object images.

Means of Solving the Problem

In order to solve the problem, an information processing apparatus according to preferred modes of the present invention includes: a keyword generator that identifies object images from video on the basis of both activity information on the activity history of a user and a first level of narrowing down and generates candidate keywords, as candidates comments, by generating a candidate keyword for each of the identified object images; an identifier that identifies one or more target keywords to be comments from among the candidate keywords generated by the keyword generator on the basis of both the activity information and a second level of narrowing down; a comment generator that generates, for each of the one or more target keywords, a comment related to each target keyword; and an adjuster that adjusts both the first level of narrowing down and the second level of narrowing down in accordance with processing information on processing performable by the keyword generator and processing performable by the identifier.

In order to solve the problem, an information processing system according to preferred modes of the present invention is an information processing system including a user apparatus managed by a user and a server, the user apparatus including: a keyword generator that identifies object images from video on the basis of both activity information on an activity history of the user and a first level of narrowing down and generates candidate keywords, as candidates comments, by generating a candidate keyword for each of the identified images; a first communicator that transmits the activity information, the candidate keywords generated by the keyword generator, and processing information on processing performable by the keyword generator to the server and receives a comment transmitted from the server; and a display controller that displays the comment on a display, the server including: a second communicator that receives the activity information, the candidate keywords, and the processing information on the processing performable by the keyword generator that are transmitted from the user apparatus and transmits the comment to the user apparatus; an identifier that identifies one or more target keywords to be comments from among the candidate keywords on the basis of both the activity information and a second level of narrowing down; a comment generator that generates, for each of the one or more target keywords, a comment related each target keyword as the comment; and an adjuster that adjusts the first level of narrowing down and the second level of narrowing down in accordance with the processing information on the processing performable by the keyword generator and processing information on processing performable by the identifier.

Effect of the Invention

According to the information processing apparatus or the information processing system of the present invention, a processing load for narrowing down for identifying object images and a processing load for narrowing down for identifying target keywords from candidate keywords can be adjusted in accordance with the processing capability.

MODES FOR CARRYING OUT THE INVENTION

1. First Embodiment

1.1. Configuration of Service System

Figure 1:
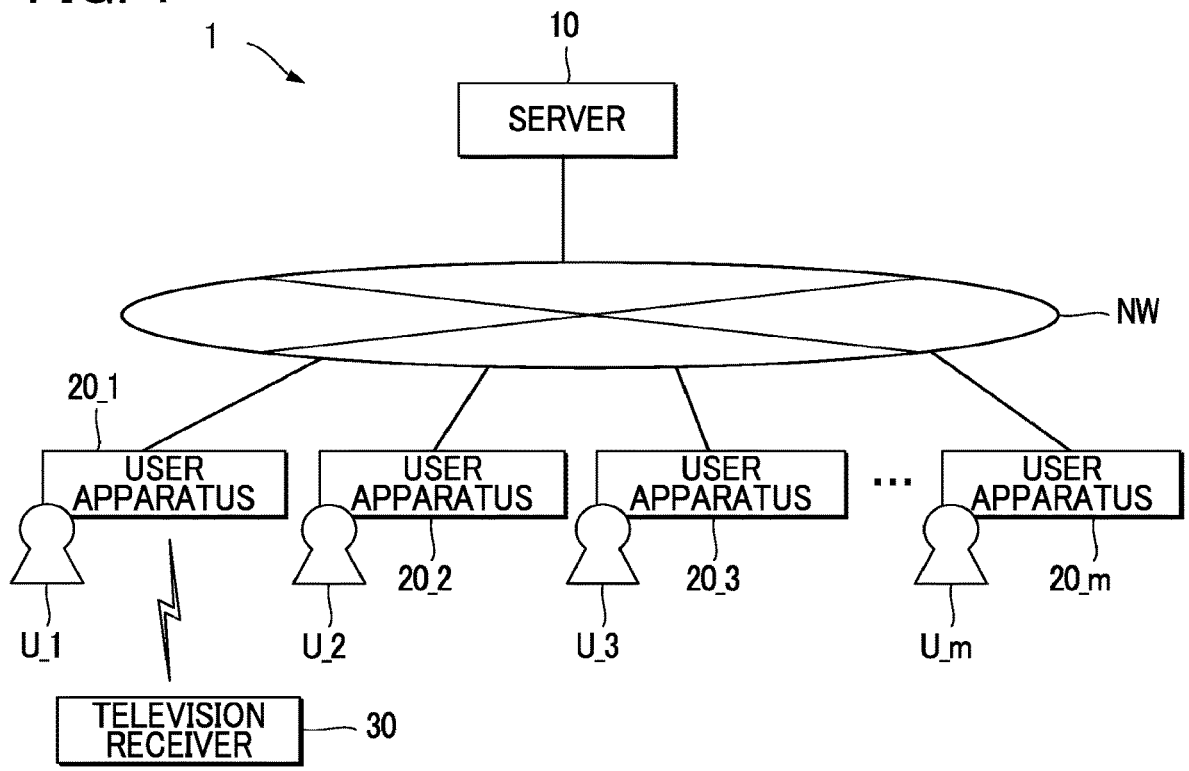
FIG. 1 is a block diagram illustrating the overall configuration of a service system according to a first embodiment of the present invention.

FIG. 1 is a block diagram illustrating the overall configuration of a service system according to a first embodiment of the present invention. A service system 1 in FIG. 1 provides a video distribution service. For example, the video distribution service provides movies or digital terrestrial broadcasting content.

As illustrated in FIG. 1, the service system 1 includes user apparatuses 20_1 to 20_m (m is an integer of 1 or more) managed by users U_1 to U_m, a network NW, and a server 10. The network NW is a communication network, such as a mobile communication network or the Internet. In the following explanation, when elements of the same kind are collectively described, the elements are indicated only with a common number, for example, a user apparatus 20 or a user U without a reference symbol.

The user apparatus 20 is an information processing apparatus for processing various kinds of information. The user apparatus 20 is a portable information processing apparatus, for example, a smartphone or a tablet. The user apparatus 20 may be any information processing apparatus. For example, the user apparatus 20 may be a terminal-type information processing apparatus such as a personal computer.

The user apparatus 20 can communicate with the server 10 via the network NW. The user apparatus 20 can receive an image signal Sa transmitted from the server 10 and display an image corresponding to the image signal Sa, or transmit the image signal Sa to a television receiver 30 and display an image on the television receiver 30. Moreover, the user apparatus 20 transmits activity information to the server 10 via the network NW. The activity information indicates the history of the activity of a user. The activity information is obtained by associating time information with position information on the position of the user, purchase information on the purchase of articles or service by the user, browsing information on browsing on the Web, and playback information on the playback of video or music.

The server 10 is an information processing apparatus that has a comment generation function and a video distribution function for transmitting the image signal Sa indicating video to the user apparatus 20. The comment generation function is the function of narrowing down, based on the activity history of the user U, object images of interest to the user U from object images included in the image of one screen of video indicated by the image signal Sa, and generating a comment on the narrowed down object images.

1.2. Configuration of Server 10

Figure 2:
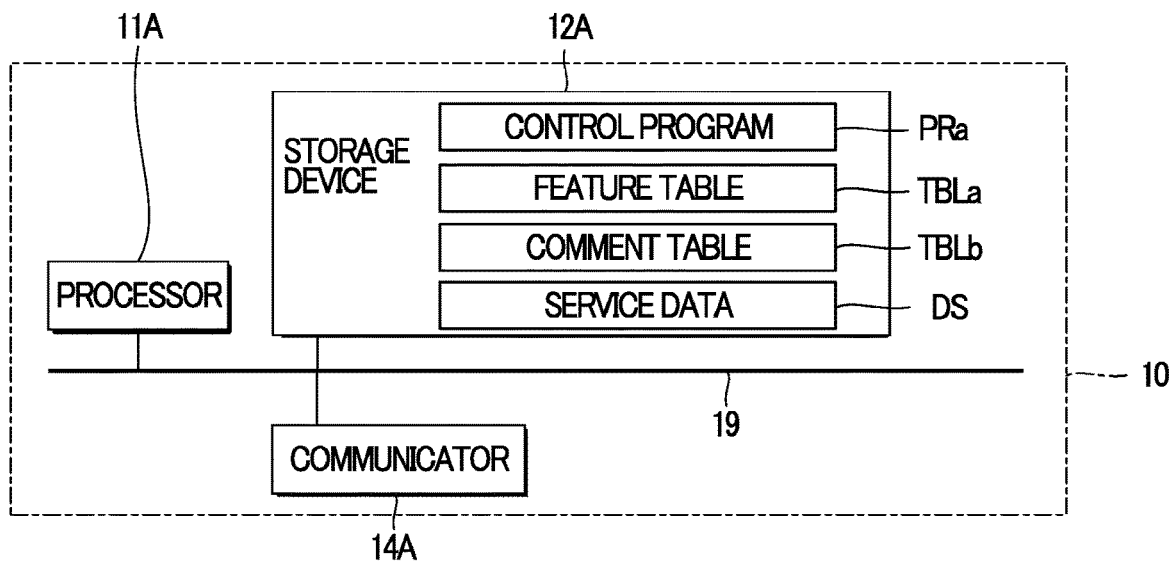
FIG. 2 is a block diagram illustrating the hardware configuration of a server used in the embodiment.

FIG. 2 is a block diagram illustrating the hardware configuration of the server 10. The server 10 is implemented by a computer system including a processor 11A, a storage device 12A, a communicator 14A, and a bus 19. The processor 11A, the storage device 12A, and the communicator 14A are connected to one another via the bus 19 for communicating information. The bus 19 may be a single bus or may include different buses among devices. Each of the elements of the server 10 includes one or more devices. Some of the elements of the server 10 may be omitted.

The processor 11A is a processor for controlling the overall server 10 and includes, for example, one or more chips. The processor 11A includes, for example, a central processing unit (CPU) that includes an interface with peripheral devices, an arithmetic unit, and a register. Some or all of the functions of the processor 11A may be implemented by hardware, for example, Digital Signal Processor (DSP), Application Specific Integrated Circuit (ASIC), Programmable Logic Device (PLD), or Field Programmable Gate Array (FPGA). The processor 11A performs parallel or sequential processing of various kinds.

The storage device 12A is a recording medium readable by the processor 11A. The storage device 12A stores programs including a control program PRa executed by the processor 11A, a feature table TBLa, a comment table TBLb, service data DS, and various kinds of data used by the processor 11A. The storage device 12A includes, for example, at least one storage circuit of Read Only Memory (ROM), Erasable Programmable ROM (EPROM), Electrically Erasable Programmable ROM (EEPROM), or Random Access Memory (RAM).

In the feature table TBLa, a term indicating an object type is associated with a feature value. The term indicating an object type is a noun, for example, a Maltese dog or wine. The feature value includes a first feature value about an object shape and a second feature value about an object color. For example, a feature value stored in association with a Maltese dog in the feature table TBLa includes a first feature value about the shape of the Maltese dog and a second feature value about the color of the Maltese dog. In the case of an object having no specific shape such as a liquid, a first feature value about the shape of a container for storing the object and a second feature value about the color of the object are stored in the feature table TBLa while being associated with a term indicating the type of object. For example, a feature value stored in association with a term "wine" in the feature table TBLa includes a first feature value about the shape of a wine bottle and a second feature value about the color of the wine.

The service data DS is video data that indicates video distributed by streaming from the server 10 to the user apparatus 20 via the network NW. The service data DS is compressed and includes an Intra-coded frame (I-frame), a Predicted Frame (P-frame), and a Bi-directional Predicted Frame (B-frame). The I-frame is an uncompressed frame. The P-frame and the B-frame are differential frames. The processor 11A generates the image signal Sa by decompressing the service data DS.

An example of the communicator 14A is a network device, a network controller, a network card, or a communication module. The communicator 14A communicates with the user apparatus 20 via the network NW under the control of the processor 11A. The communicator 14A transmits the image signal Sa to the user apparatus 20. Moreover, the communicator 14A receives activity information transmitted from the user apparatus 20 and transmits a comment, which is generated by the comment generation function, to the user apparatus 20.

1.3. Functions of Server 10

Figure 3:
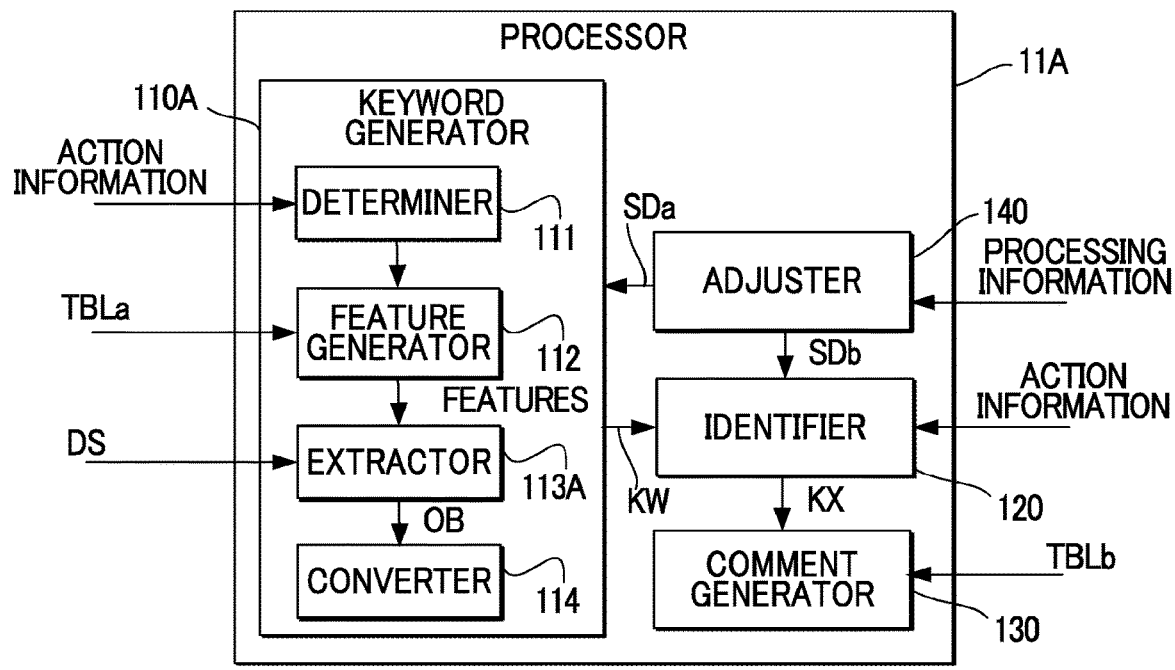
FIG. 3 is functional block diagram depicting the functions of the server used in the embodiment.

FIG. 3 is a functional block diagram depicting the functions of the server 10. The processor 11A acts as a keyword generator 110A, an identifier 120, a comment generator 130, and an adjuster 140 by reading and executing the control program PRa from the storage device 12A.

The keyword generator 110A identifies object images of interest to the user from video on the basis of both the activity information received from the user apparatus 20 via the network NW and a first level of narrowing down.

The keyword generator 110A receives first control information SDa from the adjuster 140. The first control information SDa is an example of information indicating the first level of narrowing down. The first control information SDa specifies the level of narrowing down in the keyword generator 110A. The first control information SDa specifies, for example, levels 1 to 3. Level 1 means "low" level of narrowing down. Level 2 means "intermediate" level of narrowing down. Level 3 means "high" level of narrowing down. "Low" level of narrowing down means narrowing with wide and shallow analysis of the activity history indicated by the activity information. "High" level of narrowing down means narrowing with deep analysis on the activity history indicated by the activity information. When level 1 is specified by the first control information SDa, the low level of narrowing down causes the keyword generator 110A to generate a large number of candidate keywords KW. When level 3 is specified by the first control information SDa, the high level of narrowing down causes the keyword generator 110A to generate a small number of candidate keywords KW. The higher the level of narrowing down, the deeper the analysis on the activity history. This increases the processing load of the keyword generator 110A.

As illustrated in FIG. 3, the keyword generator 110A includes a determiner 111, a feature generator 112, an extractor 113A, and a converter 114.

The determiner 111 determines a type of object to be extracted from video, based on both the evaluation result of the level of interest to the user in the object and the first control information SDa. The level of interest in the object for the user is evaluated by using an evaluation function. The variables of the evaluation function are time information, position information, purchase information, browsing information, and playback information that are indicated by the activity information in a predetermined period (e.g., in one month). The level of interest to the user in an object is output as an evaluation value. The lower the level of narrowing down of the first control information SDa, the greater the number of determined object types.

Specifically, the determiner 111 determines the type of object to be extracted from video by comparing a threshold value corresponding to the level of narrowing down with the evaluation value. For example, it is assumed that the playback information indicates the playback of video of a soccer match. In the played back soccer match, it is assumed that soccer team A meets soccer team B. Furthermore, it is assumed that the purchase information indicates the purchase of a uniform of a specific soccer player that belongs to soccer team A. Moreover, the object evaluation value of "soccer" is X1, the object evaluation value of "soccer team A" is X2, and the object evaluation value of the specific soccer player is X3. In this case, the widest concept is "soccer", whereas the narrowest concept is "specific soccer player." The concept of "soccer team A" is placed between the concept of "soccer" and the concept of "specific soccer player." In other words, the interest to the user decreases in the order of "specific soccer player," "soccer team A", and "soccer." The evaluation values are expressed as X3>X2>X1.

A threshold value corresponding to level of narrowing down 1 is denoted as R1. A threshold value corresponding to level of narrowing down 2 is denoted as R2. A threshold value corresponding to level of narrowing down 3 is denoted as R3. Furthermore, X3>R3>X2>R2>X1>R1 is set.

At level of narrowing down 1, the determiner 111 determines "object for soccer" as the type of object to be extracted from video. At level of narrowing down 2, the determiner 111 determines "object for soccer team A" as the type of object to be extracted from video. At level of narrowing down 3, the determiner 111 determines "object for a specific soccer" as the type of object to be extracted from a video. The determiner 111 determines the type of object to be extracted from a video by comparing the threshold value corresponding to the level of narrowing down with the evaluation value.

The feature generator 112 generates a feature value for the object type determined by the determiner 111. The feature generator 112 determines the feature value of an object by reading, from the feature table TBLa, the feature value for the object type determined by the determiner 111.

The extractor 113A extracts, from the service data DS, an object image having the feature value generated by the feature generator 112. From among an I-frame, a P-frame, and a B-frame that are included in the service data DS, the extractor 113A extracts the object image from the image of an I-frame. The image of an I-frame includes multiple object images. In the image of the I-frame in FIG. 4, the extractor 113A extracts, for example, images OB1 to OB5.

Figure 4:
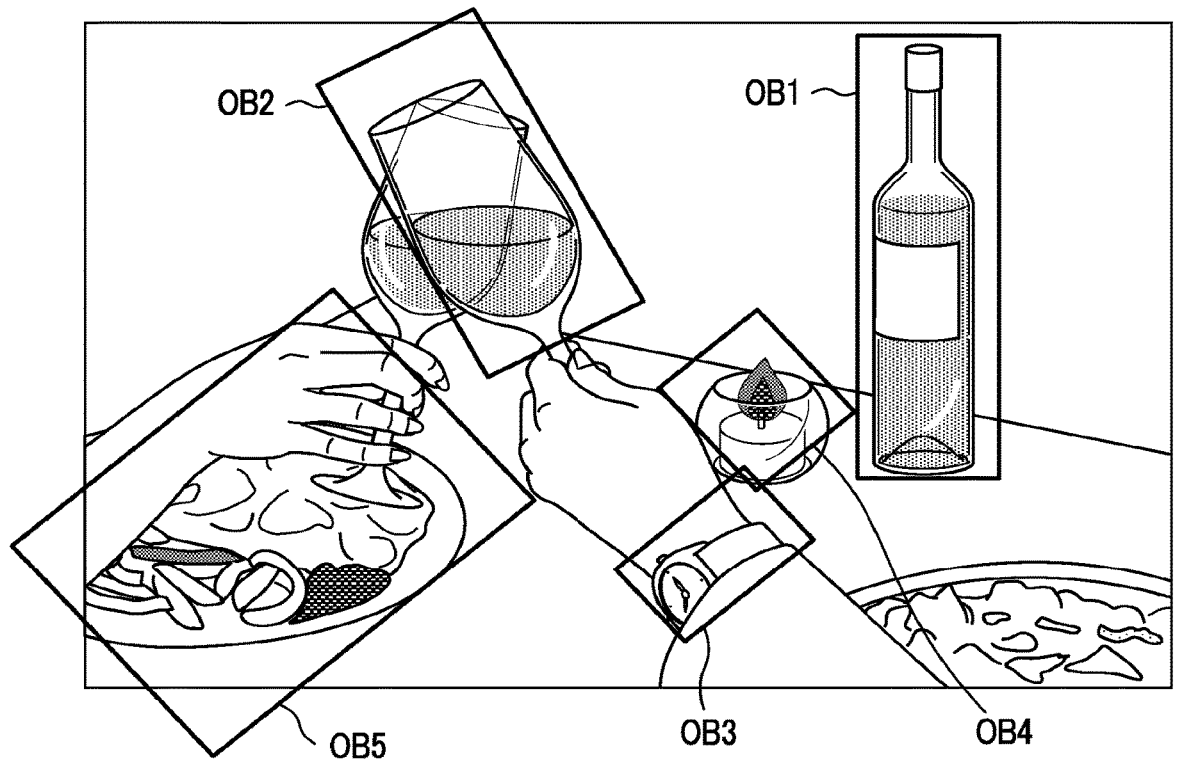
FIG. 4 is an explanatory drawing illustrating an example of an object image according to the embodiment.

The converter 114 generates the candidate keywords KW, as candidate comments by generating a candidate keyword KW for each of the object images OB extracted by the extractor 113A. Specifically, the converter 114 converts the object images OB into the candidate keywords KW. The converter 114 converts the object images OB into the candidate keywords KW by using, for example, an image recognition model learned by machine learning. For example, the image OB1 in FIG. 4 is converted to "wine," the image OB2 is converted to "wineglass," the image OB3 is converted to "watch," the image OB4 is converted to "candle," and the image OB5 is converted to "Western dish."

With the narrowing using the activity information from among the candidate keywords KW generated by the keyword generator 110A, the identifier 120 identifies one or more target keywords KX to be comments. As described above, the activity information includes the time information, the position information, the purchase information, the browsing information, and the playback information. For each of the candidate keywords KW, the identifier 120 calculates an evaluation value according to the evaluation function by using the time information, the position information, the purchase information, the browsing information, and the playback information as variables. The identifier 120 ranks the candidate keywords KW in decreasing order of evaluation values. Subsequently, based on the ranks of the candidate keywords KW and second control information SDb, the identifier 120 identifies one or more target keywords KX to be comments. The second control information SDb is an example of information indicating the second level of narrowing down.

The second control information SDb is generated by the adjuster 140 and is delivered from the adjuster 140 to the identifier 120. The second control information SDb specifies, for example, levels 1 to 3 like the first control information SDa. Level 1, level 2, and level 3 have the same meanings as level 1, level 2, and level 3 of the first control information SDa.

The number of target keywords KX identified by the identifier 120 increases as the level of narrowing down of the second control information SDb decreases. When level 1 is specified by the second control information SDb, the low level of narrowing down causes the identifier 120 to obtain a large number of target keywords KX through narrowing. When level 3 is specified by the second control information SDb, the high level of narrowing down causes the identifier 120 to obtain a small number of target keywords KX through narrowing. The higher the level of narrowing down, the heavier the processing load of the identifier 120.

The comment generator 130 generates, for each of one or more target keywords KX, a comment related to each target keyword KX. The comment means descriptions or explanations about the target keywords KX. The comment is also a concept including a recommendation. Thus, in relation to the target keyword KX, the comment includes information about an item recommended to the user U and a store that sells the item. The comment generator 130 reads a comment corresponding to the target keyword KX from the comment table TBLb that stores comments associated with keywords, so that the comment is generated. Alternatively, the comment generator 130 may access a search site connected to the network NW, retrieve information on the target keyword KX, and use the retrieved information as a comment. The comment generated by the comment generator 130 is transmitted by the communicator 14A to the user apparatus 20 by, for example, e-mail.

In accordance with processing information on processing performable by the keyword generator 110A and processing performable by the identifier 120, the adjuster 140 adjusts the level of narrowing down (first level of narrowing down) of object types in the keyword generator 110A and the level of narrowing down (second level of narrowing down) of one or more target keywords KX from the candidate keywords KW in the identifier 120. The processing information indicates the processing capability of the keyword generator 110A and the processing capability of the identifier 120. The processing capability of the keyword generator 110A and the processing capability of the identifier 120 change in accordance with the processing capability of the CPU or CPU resources allocated to the function of the keyword generator 110A and the function of the identifier 120.

When the processing capability of the CPU exceeds a predetermined threshold value or when more resources are allocated to the function of the identifier 120 than the function of the keyword generator 110A, the adjuster 140 determines that the identifier 120 has high processing capability. Whether the number of resources is greater or not is determined by, for example, at least one of the number of cores and the number of threads. For example, it is assumed that the number of cores allocated to the keyword generator 110A is "1", the number of threads allocated to the keyword generator 110A is "1", the number of cores allocated to the identifier 120 is "1", and the number of threads allocated to the identifier 120 is "2."

In this case, it is determined that the identifier 120 has a higher processing capability than the keyword generator 110A.

If it is determined that the identifier 120 has high processing capability, the adjuster 140 reduces the level of narrowing down in the keyword generator 110A and increases the level of narrowing down in the identifier 120. Specifically, the adjuster 140 generates the first control information SDa indicating level 1 and the second control information SDb indicating level 3. The provision of the first control information SDa indicating level 1 reduces the processing load of the keyword generator 110A. The provision of the second control information SDb indicating level 3 increases the processing load of the identifier 120.

When it is determined that the identifier 120 has low processing capability, the adjuster 140 increases the level of narrowing down in the keyword generator 110A and reduces the level of narrowing down in the identifier 120. Specifically, the adjuster 140 generates the first control information SDa indicating level 3 and the second control information SDb indicating level 1. The provision of the first control information SDa indicating level 3 increases the processing load of the keyword generator 110A. The provision of the second control information SDb indicating level 3 reduces the processing load of the identifier 120.

When the identifier 120 has high processing capability, the level of narrowing down in the keyword generator 110A is reduced and the level of narrowing down in the identifier 120 is increased for the following reason: The keyword generator 110A extracts an object that interests the user U by analyzing an image in the extractor 113A. However, an object is extracted with low accuracy with image processing. Thus, when the identifier 120 has high processing capability, the level of narrowing down in the keyword generator 110A is reduced. By reducing the level of narrowing down, the number of candidate keywords KW generated by the keyword generator 110A is greater than at a high level of narrowing down. However, the identifier 120 has high processing capability and thus can narrow down the target keywords KX from the increased candidate keywords KW.

When the identifier 120 has low processing capability, the processing of the identifier 120 is delayed when the number of generated candidate keywords KW exceeds the processing capability. This leads to difficulty in generating a comment at a proper timing. In this case, the number of candidate keywords KW generated by the keyword generator 110A is desirably reduced while sacrificing the accuracy of the candidate keywords KW.

In accordance with the processing capability of the keyword generator 110A and the processing capability of the identifier 120, the adjuster 140 adjusts the level of narrowing down of object types in the keyword generator 110A and the level of narrowing down of one or more target keywords KX from the candidate keywords KW in the identifier 120. This improves the accuracy of a comment of the identifier 120. Moreover, a comment is generated at a proper timing by suppressing a delay of processing.

Furthermore, the processing capability of the keyword generator 110A and the processing capability of the identifier 120 may be dynamically changed. In an example of a dynamic change of the processing capability, resources allocated to the keyword generator 110A and resources allocated to the identifier 120 decrease as the processing load of the processor 11A increases. In this case, the adjuster 140 adjusts the level of narrowing down of the keyword generator 110A and the level of narrowing down of the identifier 120 in accordance with the processing capability of the keyword generator 110A and the processing capability of the identifier 120. This improves the accuracy of a comment. A comment is generated at a proper timing.

1.4. Operations of Server 10

Figure 5:
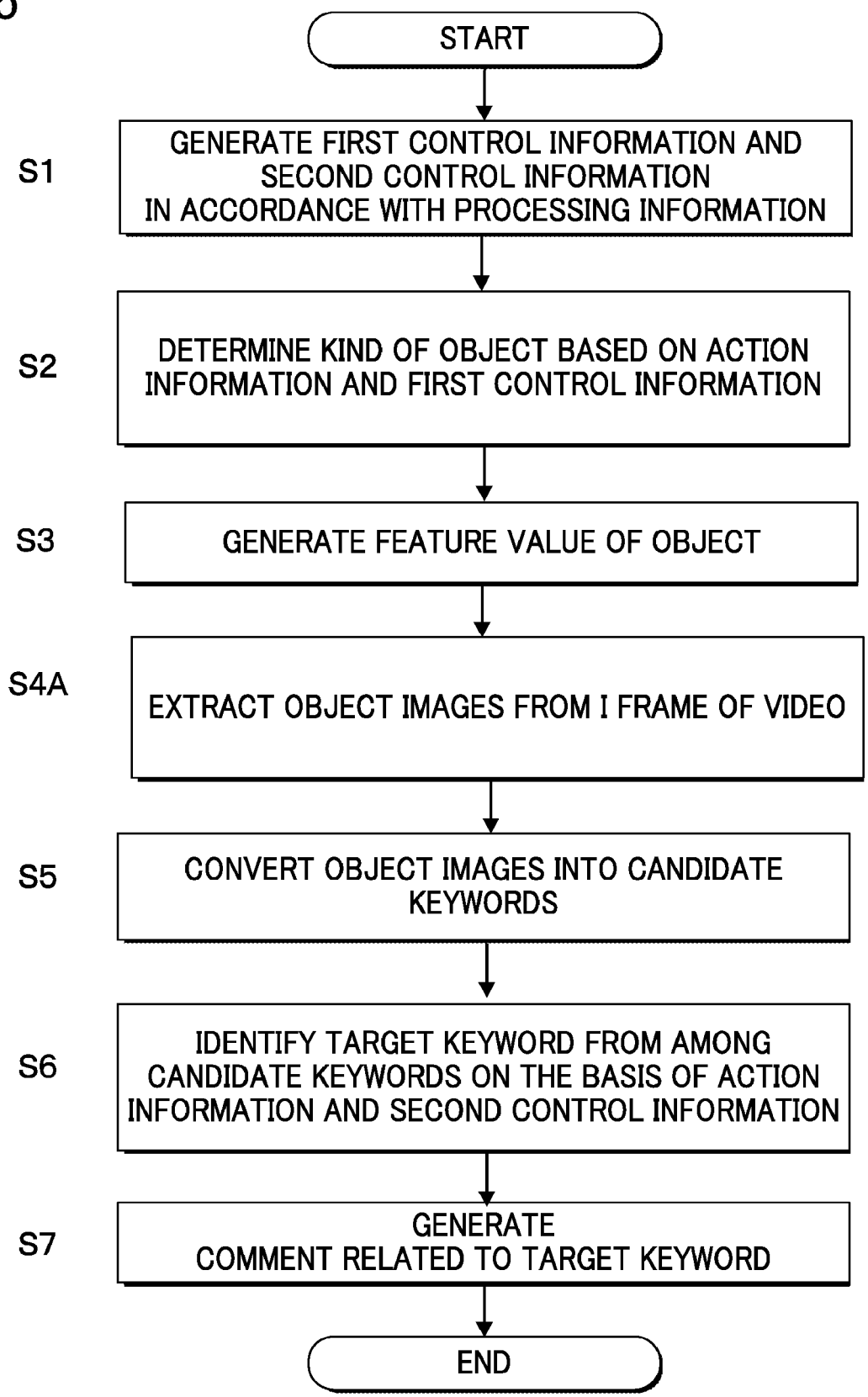
FIG. 5 is a flowchart indicating the operations of the server used in the embodiment.

The operations of the server 10 will be described below. FIG. 5 is a flowchart indicating the operations of the server 10.

First, the processor 11A generates the first control information SDa and the second control information SDb in accordance with the processing information (step S1). The server 10 includes the CPU with higher processing capability than the user apparatus 20. The processing capability of the CPU exceeds a predetermined threshold value. In step S1, the processor 11A determines that the identifier 120 has high capability and generates the first control information SDa indicating level 1 and the second control information SDb indicating level 3.

Subsequently, the processor 11A determines a type of object based on both the activity information and the level of narrowing down corresponding to the first control information SDa generated in step S1. The first control information SDa generated in step S1 of the operation example indicates level 1, thereby reducing the level of narrowing down of objects in step S2.

The processor 11A then reads a feature value from the feature table TBLa, the feature value corresponding to the object type determined in step S2 (step S3).

Based on the feature value read in step S3, the processor 11A then extracts an object image from an I-frame of a video indicated by the service data DS (step S4A). One frame image ordinarily includes multiple object images. Thus, the processor 11A extracts multiple object images in the processing of step S4A.

Subsequently, the processor 11A converts the object images extracted in step S4A into the candidate keywords KW (step S5).

Based on the activity information and the second control information SDb, the processor 11A then identifies the target keyword KX from the candidate keywords KW obtained by the processing of step S5 (step S6). Since the second control information SDb generated in step S1 of the operation example indicates level 3, narrowing is performed to deeply analyze the activity information in step S6.

The processor 11A then generates a comment related to the target keyword KX (step S7). In the processing of step S7, the processor HA reads the comment corresponding to the target keyword KX from the comment table TBLb, so that the comment is generated. The processor 11A transmits the generated comment to the user apparatus 20 by e-mail.

Moreover, the processor 11A acts as the adjuster 140 in the processing of step S1 and acts as the keyword generator 110A in the processing of step S2 to step S5. More specifically, the processor 11A acts as the determiner 111 in the processing of step S2, acts as the feature generator 112 in the processing of step S3, acts as the extractor 113A in the processing of step S4A, and acts as the converter 114 in the processing of step S5. The processor 11A also acts as the identifier 120 in the processing of step S6 and acts as the comment generator 130 in the processing of step S7.

The server 10 according to the present embodiment is an example of an information processing apparatus having a comment generation function, that is, it is the information processing apparatus of the present invention. The server 10 includes the keyword generator 110A that narrows images for objects from video based on the activity information on the activity history of the user, and generates candidate keywords as candidate comments by generating a candidate keyword for each of the narrowed down images. The server 10 further includes the identifier 120 that identifies one or more target keywords to be comments, by narrowing down the candidate keywords based on the activity information, the candidate keywords being generated by the keyword generator 110A. The server 10 further includes the comment generator 130 that generates comments related to one or more target keywords, and the adjuster 140 that adjusts the level of narrowing down of images in the keyword generator 110A and the level of narrowing down of candidate keywords in the identifier 120 in accordance with the processing information on processing performable by the keyword generator 110A and processing performable by identifier 120.

According to this configuration, the level of narrowing down in the keyword generator 110A and the level of narrowing down in the identifier 120 can be adjusted in accordance with the processing capability of the identifier 120. Since the identifier 120 has high processing capability in the server 10 according to the present embodiment, the accuracy of a comment can be improved by adjusting the keyword generator 110A to a low level of narrowing down and adjusting the identifier 120 to a high level of narrowing down.

2. Second Embodiment

In a service system 1 according to a second embodiment, a server 10 only has a video distribution function and a user apparatus 20 has a comment generation function.

Figure 6:
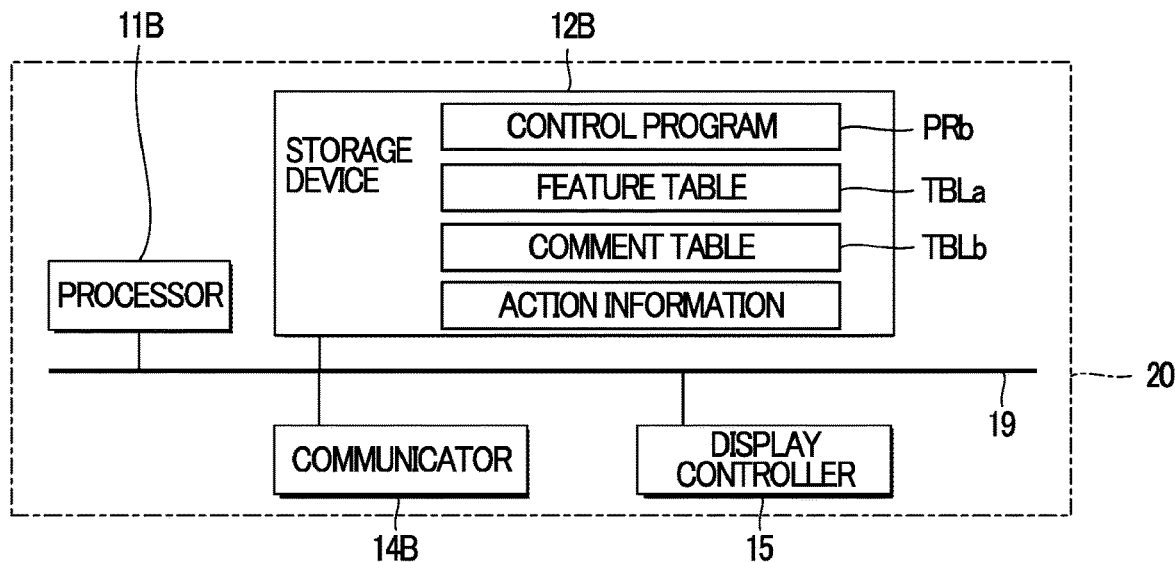
FIG. 6 is a block diagram illustrating the hardware configuration of a user apparatus used in a second embodiment.

FIG. 6 illustrates a hardware configuration example of the user apparatus 20 according to the second embodiment. The user apparatus 20 includes a processor 11B, a storage device 12B, a communicator 14B, a display controller 15, and a bus 19. The user apparatus 20 may include an output including a display and a speaker, an input such as a touch panel, a near-field radio communicator, and a GPS device in addition to the processor 11B, the storage device 12B, the communicator 14B, the display controller 15, and the bus 19. The near-field radio communicator communicates with other devices via near-field radio communications. Near-field radio communications include, for example, Bluetooth (registered trademark), ZigBee (registered trademark), and WiFi (registered trademark). The GPS device receives radio waves from satellites and generates position information based on the received radio waves.

The processor 11B, the storage device 12B, and the communicator 14B are equivalent to the processor 11A, the storage device 12A, and the communicator 14A according to the first embodiment. The storage device 12B is different from the storage device 12A in that a control program PRb is stored instead of the control program PRa, activity information is stored, and service data DS is not stored. The communicator 14B is different from the communicator 14A in that communications are performed with the server 10 under the control of the processor 11B. The communicator 14B receives an image signal Sa transmitted from the server 10 via a network NW.

The display controller 15 controls the operations of a display or a television receiver 30. The display controller 15 displays video, which is indicated by the image signal Sa, on the display or the television receiver 30. The display controller 15 generates, as an overlay image for video, an image representative of a comment generated by the comment generation function and displays the overlay image on the frame of the video on the display or the television receiver 30. A comment is not always displayed in real time during a viewing of a video. A comment may be displayed after the viewing of a video.

Figure 7:
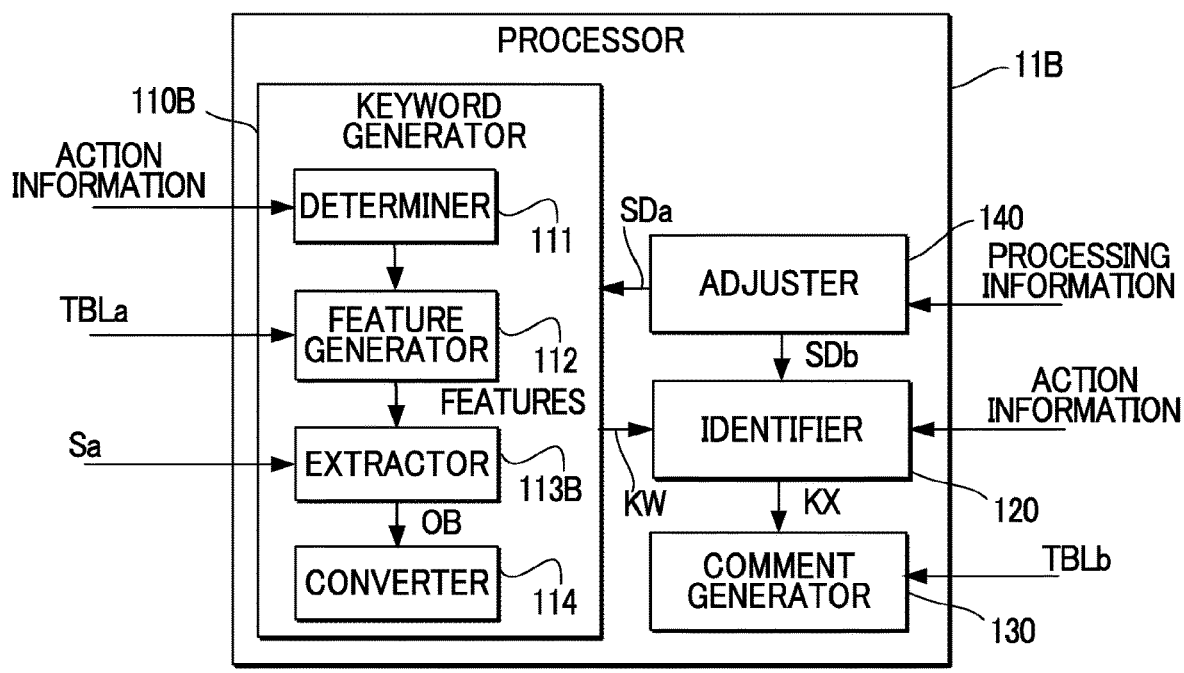
FIG. 7 is a functional block diagram depicting the functions of the user apparatus used in the second embodiment.

FIG. 7 is functional block diagram depicting the functions of the processor 11B according to the second embodiment. The processor 11B reads the control program PRb from the storage device 12B and executes the program so as to act as a keyword generator 110B, an identifier 120, a comment generator 130, and an adjuster 140. In the processor 11B according to the second embodiment, the activity information stored in the storage device 12B is provided for the keyword generator 110B and the identifier 120.

As illustrated in FIG. 7, the keyword generator 110B includes a determiner 111, a feature generator 112, an extractor 113B, and a converter 114. The image signal Sa received via the network NW is fed to the extractor 113B. The image signal Sa includes multiple frames. The image signal Sa is obtained by decompressing the service data DS, and thus, the frames indicated by the image signal Sa are not identified as an I-frame, a P-frame, or a B-frame. The extractor 113B is different from the extractor 113A according to the first embodiment in the extraction of an image of an object type determined by the determiner 111 from the images of the frames indicated by the image signal Sa.

Figure 8:
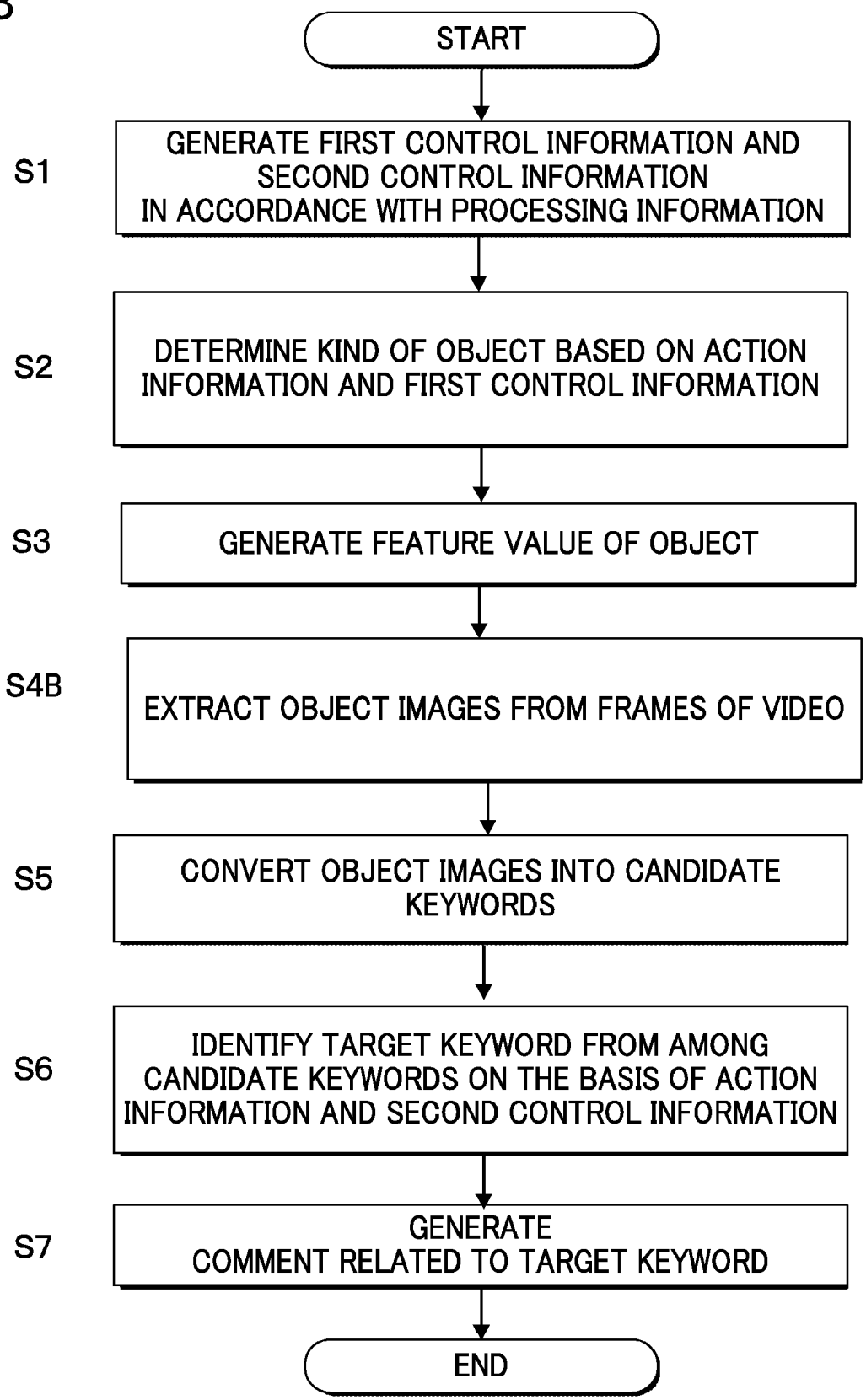
FIG. 8 is a flowchart indicating the operations of the user apparatus used in the embodiment.

The operations of the user apparatus 20 according to the second embodiment will be described below. FIG. 8 is a flowchart of the operations of the user apparatus 20 according to the second embodiment. In the user apparatus 20 according to the second embodiment, the processor 11B sequentially performs the processing of steps S1, S2, S3, S4B, S5, S6, and S7 in FIG. 7. The processor 11B acts as the adjuster 140 in the processing of step S1. Since the user apparatus 20 has a CPU with lower processing capability than the server 10, the processor 11B determines that the identifier 120 has low processing capability in step S1, and the processor 11B generates first control information SDa indicating level 3 and second control information SDb indicating level 1.

In the processing of step S2 to step S5, the processor 11B acts as the keyword generator 110B. More specifically, the processor 11B acts as the determiner 111 in the processing of step S2, the feature generator 112 in the processing of step S3, the extractor 113B in the processing of step S4B, and the converter 114 in the processing of step S5. In the present operation example, the first control information SDa generated in step S1 indicates level 3, thereby increasing the level of narrowing down in step S2. In the processing of step S4B, the processor 11B extracts object images from the frames indicated by the image signal Sa, based on a feature value read in step S3. An image in one frame ordinarily includes multiple object images. Thus, the processor 11B extracts multiple object images in the processing of step S4B.

Moreover, the processor 11B acts as the identifier 120 in the processing of step S6 and the comment generator 130 in the processing of step S7. The processor 11B displays a comment, which is generated by the processing of step S7, on the display or the television receiver 30 by using the display controller 15. In the present operation example, the second control information SDb generated in step S1 indicates level 1, thereby reducing the level of narrowing down in step S6 and the processing load of the identifier 120.

The user apparatus 20 according to the present embodiment is an example of an information processing apparatus having a comment generation function, that is, it is the information processing apparatus of the present invention. The user apparatus 20 includes the keyword generator 110B that identifies object images from video based on both the activity information on the activity history of a user and a first level of narrowing down, and generates candidate keywords as candidates to be comments on each of the identified object images. The user apparatus 20 further includes the identifier 120 that identifies one or more target keywords to be comments from among the candidate keywords generated by the keyword generator 110B based on both the activity information and a second level of narrowing down. The user apparatus 20 further includes the comment generator 130 that generates, for each of one or more target keywords, a comment related to each target keyword, and the adjuster 140 that adjusts both the level of narrowing down (first level of narrowing down) of images in the keyword generator 110B and the level of narrowing down (second level of narrowing down) of candidate keywords in the identifier 120 in accordance with processing information on processing performable by the keyword generator 110B and processing performable by the identifier 120.

According to this configuration, the level of narrowing down in the keyword generator 110B and the level of narrowing down in the identifier 120 can be adjusted in accordance with the processing capability of the identifier 120. Since the identifier 120 has low processing capability in the user apparatus 20 according to the second embodiment, the keyword generator 110B is adjusted to a high level of narrowing down and the identifier 120 is adjusted to a low level of narrowing down.

3. Third Embodiment

Figure 9:
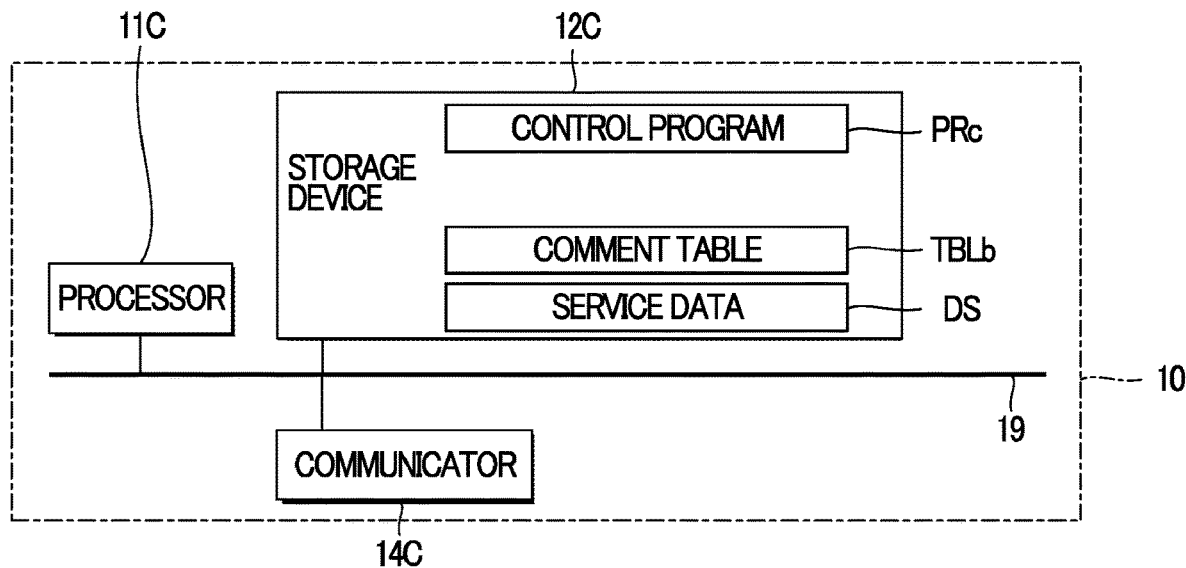
FIG. 9 is a block diagram illustrating the hardware configuration of a server used in a third embodiment.

FIG. 9 illustrates a hardware configuration example of a server 10 included in a service system 1 according to a third embodiment. The server 10 includes a processor 11C, a storage device 12C, a communicator 14C (second communicator), and a bus 19. The processor 11C, the storage device 12C, and the communicator 14C are equivalent to the processor 11A, the storage device 12A, and the communicator 14A according to the first embodiment. The storage device 12C is different from the storage device 12A in that a control program PRc is stored instead of the control program PRa and the feature table TBLa is not stored. The communicator 14C is identical to the communicator 14A in the transmission of an image signal Sa and comments to a user apparatus 20 under the control of the processor 11C. However, the communicator 14C is different from the communicator 14A in that processing information on processing in the keyword generator 110B and activity information are received from the user apparatus 20 and first control information SDa is transmitted to the user apparatus 20.

Figure 10:
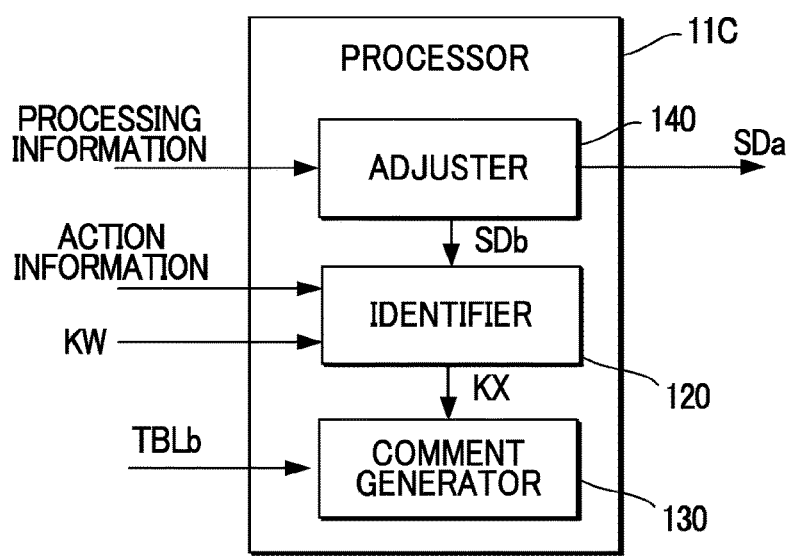
FIG. 10 is functional block diagram depicting the functions of the server used in the embodiment.

FIG. 10 is functional block diagram depicting the functions of the server 10 according to the third embodiment. The processor 11C reads the control program PRc from the storage device 12C and executes the program so as to act as an identifier 120, a comment generator 130, and an adjuster 140. The server 10 according to the third embodiment is different from the server 10 according to the first embodiment in that processing information transmitted from the user apparatus 20 via a network NW is delivered to the adjuster 140 and the first control information SDa generated by the adjuster 140 is transmitted to the user apparatus 20 via the network NW.

Figure 11:
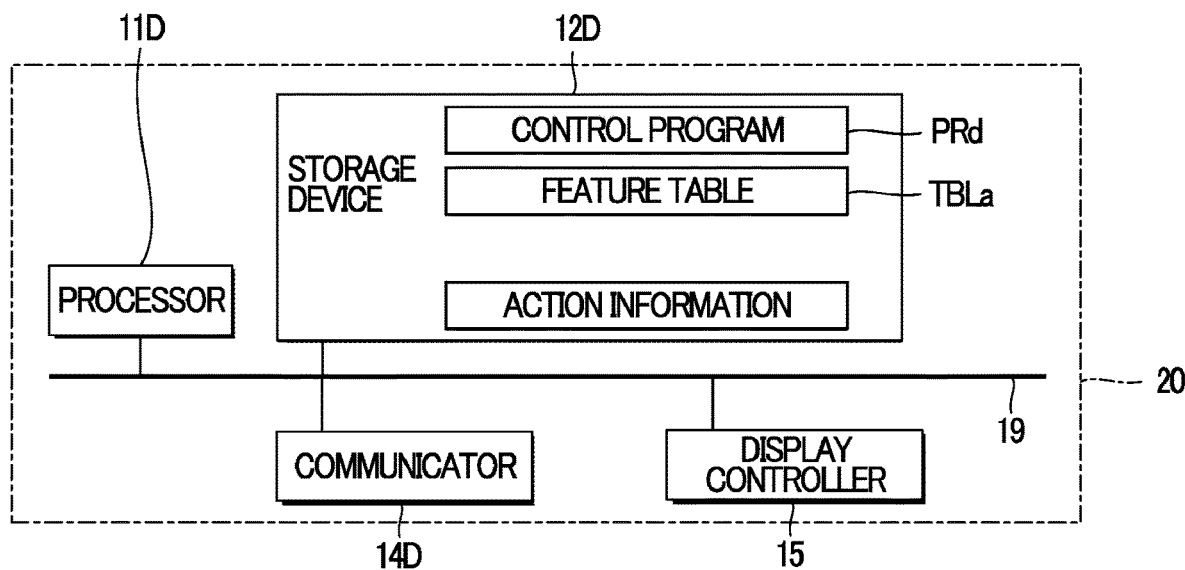
FIG. 11 is a block diagram illustrating the hardware configuration of a user apparatus used in the embodiment.

FIG. 11 illustrates a hardware configuration example of the user apparatus 20 included in a service system 1 according to the third embodiment. The user apparatus 20 includes a processor 11D, a storage device 12D, a communicator (first communicator) 14D, a display controller 15, and a bus 19. The processor 11D, the storage device 12D, and the communicator 14D are equivalent to the processor 11B, the storage device 12B, and the communicator 14B according to the second embodiment. The storage device 12D is different from the storage device 12B in that a control program PRd is stored instead of the control program PRb and the comment table TBLb is not stored. The communicator 14D is identical to the communicator 14B in the reception of an image signal Sa from the server 10 under the control of the processor 11D. However, the communicator 14D is different from the communicator 14B in that processing information on processing in a keyword generator 110B, activity information, and candidate keywords KW are transmitted to the server 10 and the first control information SDa and comments are received from the server 10.

Figure 12:
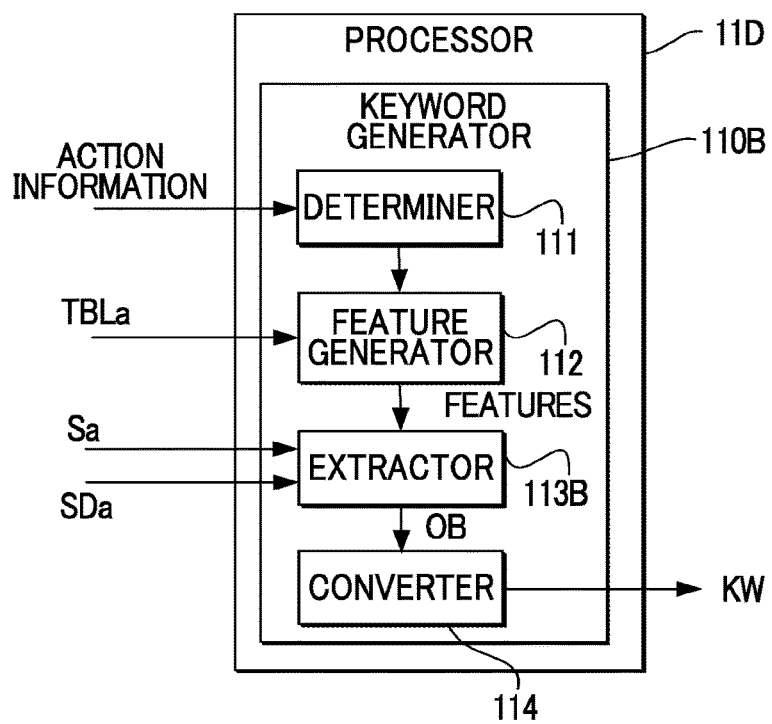
FIG. 12 is functional block diagram depicting the functions of the user apparatus used in the embodiment.

FIG. 12 is a functional block diagram showing the functions of the user apparatus 20 according to the third embodiment. The processor 11D reads the control program PRd from the storage device 12D and executes the program so as to act as the keyword generator 110B. The user apparatus 20 according to the third embodiment is different from the user apparatus 20 according to the second embodiment in that the processing information is transmitted to the server 10 via the network NW and the first control information SDa transmitted from the server 10 via the network is delivered to the keyword generator 110B.

Figure 13:
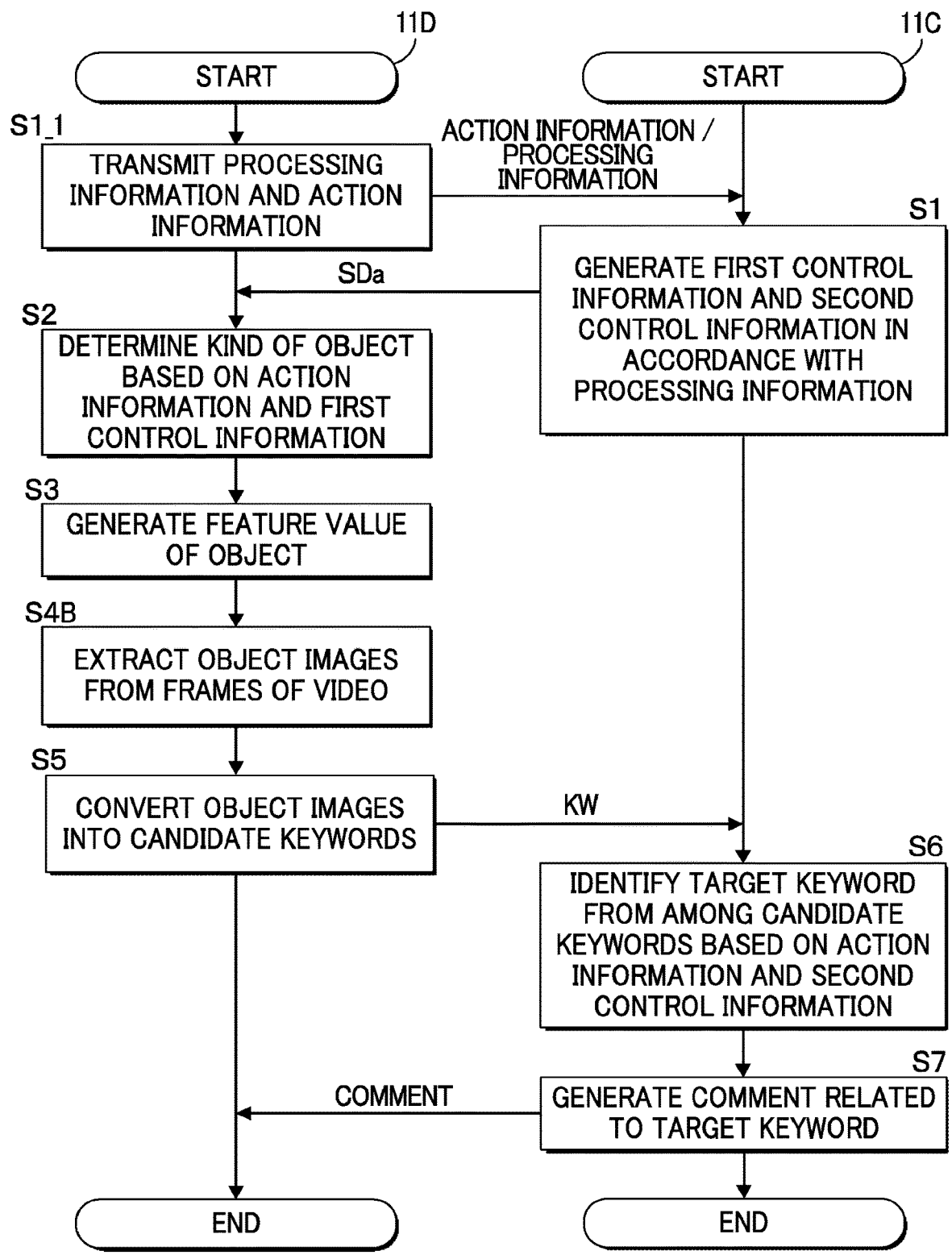
FIG. 13 is a flowchart indicating the operations of the server and the user apparatus that are used in the embodiment.

The operations of the server 10 and the user apparatus 20 according to the third embodiment will be described below. FIG. 13 is a flowchart of the operations of the server 10 and the user apparatus 20 according to the third embodiment. In the user apparatus 20 according to the third embodiment, the processor 11D sequentially performs the processing of steps S1_1, S2, S3, S4B, and S5 in FIG. 7. In the server 10 according to the third embodiment, the processor 11C sequentially performs the processing of steps S1, S6, and S7 in FIG. 12.

In the processing of step S1_1, the processor 11D transmits the processing information on the processing of the keyword generator 110B and the activity information stored in the storage device 12D to the server 10 via the network NW.

In the server 10, the processing of step S1 is performed when the activity information and the processing information are received. The processor 11C acts as the adjuster 140 in the processing of step S1. The processing information received from the user apparatus 20 indicates the processing capability of the keyword generator 110B. As described above, the user apparatus 20 has lower processing capability than the server 10, and resources that can be allocated to the keyword generator 110B in the user apparatus 20 are fewer than those allocated to the identifier 120 in the server 10. In step S1, the processor 11D determines that the identifier 120 has high processing capability and generates the first control information SDa indicating level 1 and second control information SDb indicating level 3. The first control information SDa generated by the processing of step S1 is transmitted to the user apparatus 20 via the network NW.

In the user apparatus 20, processing from step S2 is performed when the first control information SDa transmitted from the server 10 is received. In the processing of step S2 to step S5, the processor 11D acts as the keyword generator 110B. More specifically, the processor 11D acts as the determiner 111 in the processing of step S2, the feature generator 112 in the processing of step S3, the extractor 113B in the processing of step S4B, and the converter 114 in the processing of step S5. The candidate keywords KW generated by the processing of step S5 are transmitted to the server 10 via the network NW. In the present operation example, the first control information SDa transmitted from the server 10 to the user apparatus 20 indicates level 1, thereby reducing a level of narrowing down in step S2 and the processing load of the keyword generator 110B.

In the server 10, processing from step S6 is performed when the candidate keywords KW transmitted from the user apparatus 20 are received. The processor 11C acts as the identifier 120 in the processing of step S6 and the comment generator 130 in the processing of step S7. A comment generated by the processing of step S7 is transmitted from the server 10 to the user apparatus 20 by, for example, e-mail. When receiving the comment by e-mail, the user apparatus 20 displays the image of the comment on a display or a television receiver. In the present operation example, the second control information SDb indicating level 3 is generated in step S1, thereby increasing a level of narrowing down in step S6 and the processing load of the identifier 120.

The service system 1 according the present embodiment is an example of an information processing system having a comment generation function, that is, it is the information processing system according to the present invention. The service system 1 includes the user apparatus 20 managed by a user and the server 10. The user apparatus 20 includes the keyword generator 110B that identifies object images from video based on the activity information on the activity history of the user and a first level of narrowing down and generates candidate keywords as candidates to be comments by generating a candidate keyword for each of the identified images, the communicator 14D (first communicator) that transmits the activity information, the candidate keywords generated by the keyword generator 110B, and the processing information on the processing performable by the keyword generator 110B to the server 10 and receives a comment transmitted from the server 10, and the display controller 15 that displays the comment on the display. The server 10 includes the communicator 14C (second comment generator) that receives the activity information, the candidate keywords generated by the keyword generator 110B, and the processing information on the processing performable by the keyword generator 110B that are transmitted from the user apparatus 20 and transmits a comment to the user apparatus 20, the identifier 120 that identifies one or more target keywords to be comments from among the candidate keywords based on both the activity information and a second level of narrowing down, the comment generator 130 that generates, for each of one or more target keywords, a comment related to each target keyword and the adjuster 140 that adjusts the level of narrowing down (first level of narrowing down) of images in the keyword generator 110B and the level of narrowing down (second level of narrowing down) of candidate keywords in the identifier 120 in accordance with processing information on processing performable by the keyword generator 110B and processing information on processing performable by the identifier 120.

According to this configuration, the level of narrowing down in the keyword generator 110B and the level of narrowing down in the identifier 120 can be adjusted in accordance with the processing capability of the keyword generator 110B provided in the user apparatus 20 and the processing capability of the identifier 120 provided in the server 10. The keyword generator 110B has lower processing capability than the identifier 120 in the service system 1 according to the third embodiment. Thus, the keyword generator 110B is adjusted to a low level of narrowing down and the identifier 120 is adjusted to a high level of narrowing down, thereby improving the accuracy of a comment.

4. Modifications

The present invention is not limited to the foregoing embodiments. Specific modifications will be illustrated. Two or more configurations may be optionally selected and combined from the following examples.

(1) In the first embodiment, the extractor 113A may extract an object image from the service data DS by using the following frames:

First, the extractor 113A may extract an object image in a high-rating frame from among frames in an image. In this case, the extractor 113A may acquire ratings in real time from an external device. Specifically, the extractor 113A extracts an object image in a frame where an acquired rating exceeds a predetermined rating. It is estimated that a high-rating frame is more interesting to the user U than other frames. Thus, an object image is extracted from the image of a frame that interests the user U, thereby generating a useful comment for the user U.

Secondly, the extractor 113A may receive the audio signal of the user U from the user apparatus 20 and extract an object image from a frame that interests the user U based on the audio signal. For example, an object image may be extracted from a frame where the user U raised a cheer.

Thirdly, the extractor 113A may extract an object image in a frame serving as the theme of a program based on program information. For example, the extractor 113A may analyze the service data DS and identify a frame as the theme of the program. In this case, the extractor 113A may acquire the program information from an external device via the network NW.

Likewise, in the second and third embodiments, a frame where the extractor 113B extracts an object image from the image signal Sa may be a high-rated frame, a frame that interests the user U, or a frame as the theme of a program.

(2) The adjuster 140 may adjust a level of narrowing down (first level of narrowing down) in the determiner 111 and a level of narrowing down (second level of narrowing down) in the identifier 120 according to the quality of video instead of, or in addition to, the processing capability. The quality of video is included in the processing information. A specific example of the quality of a video is the frame rate of a video or the resolution in each frame of the video. If the processing information includes the quality of the video, the adjuster 140 reduces the level of narrowing down of images in the keyword generator and increases the level of narrowing down of candidate keywords in the identifier in the case of high-quality video as compared with low-quality video. This is because the processing load on the keyword generator for the high-quality video is higher than that for the low-quality video.

(3) In the first embodiment, a keyword converted from an object image identified based on activity information is used as a candidate keyword without being changed. However, in narrowing down in the keyword generator 110A, the superordinate concept of a keyword converted from an object image identified based on the activity information may be used as a candidate keyword instead of, or in addition to, the keyword. A target keyword may be narrowed down to the subordinate concept in narrowing down in the identifier 120. For example, when a keyword converted from an object image identified based on the activity information is "SUV" (Sport Utility Vehicle), "car" as a superordinate concept of "SUV" may be used as a candidate keyword in addition to, or instead of, "SUV" in narrowing in the keyword generator 110A and the target keyword may be narrowed to "SUV" in narrowing down in the identifier 120. If a keyword converted from an object image identified based on the activity information is "rose", "flower" as a superordinate concept of "rose" may be used as a candidate keyword in addition to, or instead of, "rose" in narrowing down in the keyword generator 110A and the target keyword may be narrowed down to "rose" in narrowing down in the identifier 120. The level of the superordinate concept may be adjusted according to the processing capability of the keyword generator 110A. A superordinate concept may be similarly used for narrowing down in the keyword generator 110B.

(4) In the first and third embodiments, a comment is transmitted from the server 10 to the user apparatus 20 by, for example, e-mail. However, the image signal Sa with an overlaid comment may be transmitted from the server 10 to the user apparatus 20. A comment is not always displayed in real time, and it may be displayed after the viewing of a video.

(5) Examples of the information processing apparatus of the present invention are the server 10 in the first embodiment and the user apparatus 20 in the second embodiment. However, the information processing apparatus of the present invention is not limited to the server or to the user apparatus as long as the information processing apparatus includes the keyword generator that identifies object images from a video based on the activity information on the activity history of the user and the first level of narrowing down and generates candidate keywords as candidates to be comments of the identified images, the identifier that identifies one or more target keywords to be comments, from the candidate keywords based on the activity information and the second level of narrowing down, the candidate keywords being generated by the keyword generator, the comment generator that generates comments associated with one or more target keywords, and the adjuster that adjusts the level of narrowing down (first level of narrowing down) of images in the keyword generator and the level of narrowing down (second level of narrowing down) of candidate keywords in the identifier according to the processing information on the processing of the keyword generator and the identifier.

For example, a relay (a switching hub, a router, or a gateway) for relaying the image signal Sa, which is transmitted from a video distribution server to the user apparatus may include a keyword generator, an identifier, a comment generator, and an adjuster. With this relay, the image signal Sa transmitted from the video distribution server can be transferred to the user apparatus with an overlaid image of a comment generated by the comment generator. Moreover, the relay enables an adjustment of the level of narrowing down in the keyword generator and the level of narrowing down in the identifier according to the processing capability of the identifier.

In a server having the comment generation function, that is, the server of the present invention, it is only necessary to provide the information processing apparatus that includes the keyword generator, the identifier, the comment generator, and the adjuster, and the communicator that receives the activity information transmitted from the user apparatus managed by the user and transmits a comment to the user apparatus. Likewise, in the user apparatus having the comment generation function, that is, the user apparatus of the present invention, it is only necessary to provide the information processing apparatus that includes the keyword generator, the identifier, the comment generator, and the adjuster, and the display controller that displays a comment on the display.

(6) The block diagrams used for explaining the embodiments illustrate the blocks of functional units. The functional blocks (configurations) are implemented by any combination of hardware and/or software. Moreover, means for implementing the functional blocks is not particularly limited. Specifically, each of the functional blocks may be implemented by a physically and/or logically coupled apparatus or direct and/or indirect (e.g., wired and/or wireless) coupling of two or more physically and/or logically separated apparatuses. For example, the function of the determiner 111 may be provided from another server coupled via the network NW. Similarly, the function of the feature generator 112 may be provided from another server coupled via the network NW, and the feature table TBLa may be provided in another server.

The term "apparatus" in the explanations of the embodiments may be understood to be the same as other terms such as "circuit", "device", and "unit".

(7) In the procedures, sequences, and flowcharts of the embodiments, the order may be changed, unless there is a conflict. For example, the method described in the present specification presents various step elements in an exemplary order, but it is not limited to the presented specific order.

(8) In the foregoing embodiments, input and output information or the like may be stored in a specific location (e.g., memory) or a management table. The input and output information can be overwritten, updated, or written with additional information. The output information may be deleted. The input information may be transmitted to another apparatus.

(9) In the foregoing embodiments, the determination may be performed by a value (0 or 1) expressed as 1 bit, a Boolean value (true or false), or a comparison between numeric values (for example, a comparison with a predetermined value).

(10) The storage device 12A in the first embodiment is a recording medium readable by the processor 11A. ROM and RAM are described as examples. The storage device 12A may be a flexible disk, a magneto-optical disk (e.g., a compact disk, a digital versatile disk, or a Blu-ray (registered trademark) disk), a smart card, a flash memory device (e.g., a card, a stick, or a key drive), a CD-ROM (Compact Disc-ROM), a register, a removable disk, a hard disk, a floppy (registered trademark) disk, a magnetic strip, a database, a server, or other suitable recording media. The storage device 12B in the second embodiment and the storage device 12C and the storage device 12D in the third embodiment are identical to the storage device 12A. The program may be transmitted from the network NW. Alternatively, the program may be transmitted from a communication network via a telecommunication line.

(11) The embodiments may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and a system using other suitable systems and/or a next-generation system expanded based on the systems.

(12) In the foregoing embodiments, the described information and signals may be expressed by any one of various techniques. For example, data, instructions, commands, information, signals, bits, symbols, and chips that can be mentioned in the overall description may be expressed by a voltage, a current, an electromagnetic wave, a magnetic field or magnetic particles, an optical field or a photon, or any combination thereof.

Terms described in the present specification and/or terms necessary for understanding the present specification may be replaced with terms having the same or similar meanings.

(13) The functions illustrated in FIGS. 3, 7, 10, and 12 are implemented by any combination of hardware and software. The functions may be implemented by a single apparatus or two or more separate apparatuses.

(14) The programs described in the embodiments should be widely interpreted as commands, command sets, codes, code segments, program codes, subprograms, software modules, applications, software applications, software packages, routines, subroutines, objects, executable files, executive threads, procedures, or functions regardless of whether the programs are to be denoted as software, firmware, middleware, microcodes or hardware description languages, or by other names.

Software and commands may be transmitted and received via a transmission medium. For example, when software is transmitted from a website, a server, or other remote sources by using wired technology with a coaxial cable, an optical fiber cable, a twisted pair cable, and a digital subscriber line (DSL) or the like and/or wireless technology with infrared rays, radio, and microwaves or the like, the definition of a transmission medium includes the wired technology and/or wireless technology.

(15) In the foregoing embodiments, terms "system" and "network" are used with similar meaning.

(16) In the foregoing embodiments, information and parameters or the like may be expressed as absolute values, values relative to a predetermined value, or another corresponding information.

(17) In the foregoing embodiments, the user apparatus 20 may be a mobile station. A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms by one skilled in the art.

(18) In the foregoing embodiments, the term "connected" or any modifications thereof mean any direct or indirect connection or coupling between two or more elements, and can include the presence of one or more intermediate elements between two "connected" elements. A logical connection, a physical connection, or a combination thereof may be made between elements. In the use in the present specification, it can be assumed that two elements are "connected" to each other by using one or more electric wires and cables and/or printed electrical connection and by using, as some unrestricted and not comprehensive examples, and electromagnetic energy has wavelengths in a radio frequency range, a microwave range, or an optical (visible and invisible) range.

(19) In the foregoing embodiments, "based on" does not mean "only based on" unless otherwise specified. In other words, "based on" means "only based on" and "at least based on."

(20) References to the elements designated as "first" and "second" or the like in the present specification do not collectively limit the amounts or the order of the elements. The designations can be used as a useful method for discriminating between two or more elements. Thus, references to the first and second elements do not mean that only the two elements can be adopted or the first element should be followed by the second element in any fashion.

(21) In the foregoing embodiments, "including", "comprising", and modifications thereof are intended to be generic like "provided with" as long as these terms are used in the present specification or the claims. Furthermore, a term "or" used in the present specification or the claims is not intended to be an exclusive OR.

(22) In the overall specification, for example, when articles such as "a", "an", and "the" in English are added in translation, these articles include plurals unless plurals are clearly excluded by the context.

(23) It is evident for one skilled in the art that the present invention is not limited to the embodiments described in the present specification. The present invention can be corrected and modified without departing from the spirit and scope of the present invention as defined based on the claiming in the claims. Thus, the present specification is intended to present an exemplary description and is not intended to in any way restrict the present invention. Configurations selected from those illustrated in the present specification may be combined.

DESCRIPTION OF REFERENCE SIGNS

1: service system, 10: server, 11A, 11B, 11C, 11D: processors, 20: user apparatus, 12A, 12B: storage, 14A, 14B, 14C, 14D: communicator, 15: display, 19: bus, 110A, 110B: keyword generator, 111: determiner, 112: feature generator, 113A, 113B: extractor, 114: converter, 120: identifier, 130: comment generator, 140: adjuster, PRa, PRb, PRc, PRd: control program, TBLa: feature table, TBLb: comment table, DS: service data, KW: candidate keyword, KX: target keyword.

The invention claimed is:

1. An information processing apparatus comprising:
processing circuitry configured to implement
   a keyword generator configured to identify object images from video based on both activity information on an activity history of a user and a first level of narrowing down and to generate candidate keywords, as candidates to be comments, by generating a candidate keyword for each of the identified object images;
   an identifier configured to identify one or more target keywords to be comments from among the candidate keywords generated by the keyword generator based on both the activity information and a second level of narrowing down;
   a comment generator configured to generate, for each of the one or more target keywords, a comment related to each target keyword; and
   an adjuster configured to adjust both the first level of narrowing down and the second level of narrowing down in accordance with processing information on processing performable by the keyword generator and processing performable by the identifier.

2. The information processing apparatus according to claim 1, wherein the processing information includes processing capability of the identifier.

3. The information processing apparatus according to claim 2, wherein when the identifier has high processing capability, the adjuster is configured to reduce the first level of narrowing down and to increase the second level of narrowing down as compared with a time when the identifier has low processing capability.

4. The information processing apparatus according to claim 1, wherein the processing information includes information on quality of the video.

5. The information processing apparatus according to claim 4, wherein when the video has high quality, the adjuster is configured to reduce the first level of narrowing down and to increase the second level of narrowing down as compared with a time when the video has low quality.

6. The information processing apparatus according to claim 1, wherein
   the adjuster is configured to output control information to the keyword generator, the control information indicating the first level of narrowing down,
   the keyword generator comprises:
      a determiner configured to determine a type of object to be extracted from the video, based on both the control information and an evaluation result of a level of interest of the user in an object based on the activity information;
      a feature generator configured to generate a feature value of images of objects of the type determined by the determiner; and
      an extractor configured to extract object images having the feature value from the video, and
   the keyword generator comprises:
      a converter configured to convert the object images extracted by the extractor into the candidate keywords.

7. A server comprising:
an information processing apparatus that includes:
processing circuitry configured to implement
   a keyword generator configured to identify object images from video based on both activity information on an activity history of a user and a first level of narrowing down and to generate candidate keywords, as candidates to be comments, by generating a candidate keyword for each of the identified object images;
   an identifier configured to identify one or more target keywords to be comments from among the candidate keywords generated by the keyword generator based on both the activity information and a second level of narrowing down;
   a comment generator configured to generate, for each of the one or more target keywords, a comment related to each target keyword; and
   an adjuster configured to adjust both the first level of narrowing down and the second level of narrowing down in accordance with processing information on processing performable by the keyword generator and processing performable by the identifier; and
a communicator configured to receive the activity information transmitted from a user apparatus managed by the user and to transmit the comment to the user apparatus.

8. A user apparatus comprising:
an information processing apparatus that includes:
processing circuitry configured to implement
   a keyword generator configured to identify object images from video based on both activity information on an activity history of a user and a first level of narrowing down and to generate candidate keywords, as candidates to be comments, by generating a candidate keyword for each of the identified object images;
   an identifier configured to identify one or more target keywords to be comments from among the candidate keywords generated by the keyword generator based on both the activity information and a second level of narrowing down;
   a comment generator configured to generate, for each of the one or more target keywords, a comment related to each target keyword; and
   an adjuster configured to adjust both the first level of narrowing down and the second level of narrowing down in accordance with processing information on processing performable by the keyword generator and processing performable by the identifier; and
a display controller configured to display the comment on a display.

9. An information processing system comprising a user apparatus managed by a user and a server,
the user apparatus comprising:
processing circuitry configured to implement
   a keyword generator configured to identify object images corresponding to objects from video based on both activity information on an activity history of the user and a first level of narrowing down and to generate candidate keywords, as candidate comments, by generating a candidate keyword for each of the identified object images; and
   a first communicator configured to transmit the activity information, the candidate keywords generated by the keyword generator, and processing information on processing performable by the keyword generator to the server and to receive a comment transmitted from the server; and a display controller configured to display the comment on a display, the server comprising:

a second communicator configured to receive the activity information, the candidate keywords, and the processing information on the processing performable by the keyword generator that are transmitted from the user device and to transmit the comment to the user apparatus; and processing circuitry configured to implement an identifier configured to identify one or more target keywords to be comments from among the candidate keywords based on both the activity information and a second level of narrowing down;

a comment generator configured to generate, for each of the one or more target keywords, a comment related to each target keyword as the comment to be transmitted to the user apparatus; and an adjuster configured to adjust the level of narrowing down of the images in the keyword generator and the first level of narrowing down and the second level of narrowing down for the candidate keywords in the identifier in accordance with the processing information on the processing performable by the keyword generator and processing information on processing performable by the identifier.

* * * * *

UNITED STATES PATENT AND TRADEMARK OFFICE
CERTIFICATE OF CORRECTION

| | | |
|---|---|---|
| PATENT NO. | : 11,800,198 B2 | Page 1 of 1 |
| APPLICATION NO. | : 17/437619 | |
| DATED | : October 24, 2023 | |
| INVENTOR(S) | : Akira Tanaka et al. | |

It is certified that error appears in the above-identified patent and that said Letters Patent is hereby corrected as shown below:

On the Title Page

Please correct the following information from:
"(87) PCT Pub. No.: WO2020/194925
PCT Pub. Date: Jan. 10, 2020"
To:
-- (87) PCT Pub. No.: WO2020/194925
PCT Pub. Date: Oct. 1, 2020 --

Signed and Sealed this
Second Day of April, 2024

*Katherine Kelly Vidal*

Katherine Kelly Vidal
*Director of the United States Patent and Trademark Office*